(12) United States Patent
Grossman et al.

(10) Patent No.: US 9,767,059 B2
(45) Date of Patent: Sep. 19, 2017

(54) MULTIMEDIA USB DEVICE SERVER

(71) Applicant: HARMAN BECKER AUTOMOTIVE SYSTEMS GmbH, Karlsbad (DE)

(72) Inventors: Volker Grossman, Straubenhardt (DE); Jens Oertel, Bad Bergzabern (DE); Thomas Degueldre, Karlsruhe (DE)

(73) Assignee: HARMAN BECKER AUTOMOTIVE SYSTEMS GMBH, Karlsbad (DE)

( * ) Notice: Subject to any disclaimer, the term of this patent is extended or adjusted under 35 U.S.C. 154(b) by 301 days.

(21) Appl. No.: 14/598,224

(22) Filed: Jan. 16, 2015

(65) Prior Publication Data

US 2015/0205743 A1 Jul. 23, 2015

(30) Foreign Application Priority Data

Jan. 22, 2014 (EP) .................................... 14152152

(51) Int. Cl.
*G06F 13/40* (2006.01)
*G06F 13/38* (2006.01)
*G06F 3/06* (2006.01)

(52) U.S. Cl.
CPC .......... *G06F 13/4022* (2013.01); *G06F 3/067* (2013.01); *G06F 13/385* (2013.01)

(58) Field of Classification Search
CPC ........ G06F 3/067; G06F 3/0683; G06F 13/12; G06F 13/14; G06F 13/20; G06F 13/36; G06F 13/38; G06F 13/40; G06F 13/4004; G06F 13/4022; G06F 13/4027; G06F 13/4045; G06F 17/30194; G06F 17/30197; G06F 17/302; G06F 17/30218; G06F 13/387

See application file for complete search history.

(56) References Cited

U.S. PATENT DOCUMENTS

| 7,523,243 | B2* | 4/2009 | Bohm | G06F 13/385 710/104 |
| 8,903,244 | B2* | 12/2014 | Walter | H04L 12/2898 398/115 |
| 2003/0070103 | A1* | 4/2003 | Kim | G06F 1/26 713/300 |
| 2005/0034057 | A1* | 2/2005 | Hull | G06F 17/212 715/202 |
| 2005/0068581 | A1* | 3/2005 | Hull | G06F 3/1206 358/1.16 |

(Continued)

FOREIGN PATENT DOCUMENTS

WO 2006108174 A2 10/2006

OTHER PUBLICATIONS

"Client/Server Definition". The Linux Information Project. Online Nov. 26, 2005. Retrieved from Internet Jan. 5, 2017. <http://www.linfo.org/client_server.html>.*

(Continued)

*Primary Examiner* — Thomas J Cleary
(74) *Attorney, Agent, or Firm* — Artegis Law Group, LLP

(57) ABSTRACT

The present invention relates to a multimedia server means, comprising a plurality of universal serial bus, USB, connections and a processing means configured to establish a one-by-one data connection between a USB data storage device connected to a first one of the plurality of USB connections and an electronic device connected to a second one of the plurality of USB connections.

13 Claims, 4 Drawing Sheets

(56) References Cited

U.S. PATENT DOCUMENTS

| | | | | |
|---|---|---|---|---|
| 2005/0071763 A1* | 3/2005 | Hart | ................ | G06K 15/00 |
| | | | | 715/731 |
| 2008/0109838 A1* | 5/2008 | Zureczki | ............ | H04N 7/17318 |
| | | | | 725/5 |
| 2008/0126589 A1* | 5/2008 | Husain | .................... | G06F 3/023 |
| | | | | 710/14 |
| 2008/0147924 A1* | 6/2008 | Lambert | ............. | G06F 13/4072 |
| | | | | 710/62 |
| 2008/0183836 A1* | 7/2008 | Barber | ................. | G06F 3/0605 |
| | | | | 709/211 |
| 2009/0096336 A1* | 4/2009 | Petrick | ................ | G06F 13/4022 |
| | | | | 312/237 |
| 2009/0158377 A1* | 6/2009 | Diab | ....................... | G06F 1/266 |
| | | | | 725/117 |
| 2009/0313263 A1* | 12/2009 | Sato | .................... | G06F 3/04817 |
| 2009/0319064 A1* | 12/2009 | Chang | ............. | G11B 20/10 |
| | | | | 700/94 |
| 2011/0109371 A1* | 5/2011 | Kastl | .................... | G06F 1/3203 |
| | | | | 327/427 |
| 2011/0113219 A1* | 5/2011 | Golshan | ............. | G06F 9/44505 |
| | | | | 712/30 |
| 2015/0205744 A1* | 7/2015 | Grossman | ........... | G06F 13/4022 |
| | | | | 710/316 |

OTHER PUBLICATIONS

"Universal Serial Bus Specification Revision 2.0", No. Rev. 2.0, Apr. 27, 2000 (Apr. 27, 2000), pp. 1-622, XP001544046.
International Search Report for Application No. EP-14-15-2152, dated Mar. 26, 2014.

* cited by examiner

MULTIMEDIA USB DEVICE SERVER

FIELD OF INVENTION

The present invention relates to a server for multimedia USB devices that, in particular, is configured for allowing access to a plurality of media storage devices.

BACKGROUND OF THE INVENTION

Electronic consumer products for playing back media have to be enabled to readily access a media data stored on media storage devices. In particular, an increasing variety and amount of media data have to be accessed by contemporary media players in order satisfy the demands of discriminating customers.

In the art, network attached storage (NAS) multimedia servers have been introduced in order to allow access to multiple media data files. NAS is designed as an easy and self-contained solution for sharing data files over a network. NAS servers usually contain one or more hard disks that may be arranged into logical, redundant storage containers. Alternatively, USB hub connected media storage devices are provided in the art in order to allow media player access to media data.

However, both the NAS system and the USB-hub based approach undesirably restrict the number of accessible USB media data storage devices. However, the demand for accessing a huge amount of media data by media players will further increase in the future.

Thus, it is an object of the present invention to provide for a multimedia server allowing access to an increased number of USB media data storage devices and, thus, media files, as compared to the art.

DESCRIPTION OF THE INVENTION

The above-mentioned object is addressed by a multimedia server means, comprising a plurality of universal serial bus, USB, connections and a processing means that is configured to establish a one-by-one data connection between a USB data storage device connected to a first one of the plurality of USB connections and an electronic device connected to a second one (different from the first one) of the plurality of USB connections. A relatively huge number of USB connections (connectors), for example, up to 64 USB connections for connecting USB data storage devices plus one (or more) additional USB connection for connecting the electronic device, can be provided by the multimedia server means and, thus, a relatively huge number of USB data storage devices can be handled by the multimedia server means.

The electronic device can be any device that is configured to access media data stored on the USB data storage device. The electronic device may be a receiver or media player configured for playing back audio and/or video data. The USB data storage device may be a USB memory stick or hard disk drive, for example. The processing means may be realized in form of an embedded computer, for example, a single-board computer.

During the one-by-one data connection established by the processing means the electronic device connected to the second one of the plurality of USB connections can access media data stored on the USB data storage device connected to the first one of the plurality of USB connections. The one-by-one data connection is an exclusive connection via the multimedia server means between the electronic device and the USB data storage device. No other data connection via the multimedia server means between the electronic device and any other USB device apart from the USB data storage device is established by the processing means. This feature is in sharp contrast to the operation of a USB hub. Thereby, power can be saved since during the one-by-one connection power has only to be supplied to the USB data storage device used by the electronic device whereas in the conventional USB hub all USB connections have to be supplied with electric power. In addition, the multimedia server means provides an alternative approach as compared to the network attached storage (NAS) multimedia servers known in the art. Both NAS systems and USB hubs suffer from the problem of a very limited number of electronic devices and USB data storage devices that can be managed. The inventive multimedia server means provided herein allows for connecting up to 64 USB data storage devices, for example, which allows accessing 256 Tbyte media data by one electronic media device used for accessing data stored on the USB data storage devices. Moreover, the conventional NAS approach suffers from higher energy consumption as compared to the one-by-one connection, for example, due to the almost continuous operation of hard disk drives. Consequently, a relatively inexpensive and easy to produce and install technology for accessing a huge amount of media data is provided.

In order to provide such a relatively huge amount of data, i.e., to support a relatively large number of USB data storage devices, a cascading architecture may be provided wherein the multimedia server means comprises a plurality of multimedia switch boards, for example, four switch boards, in data connection with the processing means and wherein each of the switch boards comprises USB connections, for example, 16 USB connections adding up to 64 USB connections for connecting USB data storage (plus one (or more) additional USB connection for connecting the electronic device) of the entire multimedia server means. In the cascading architecture, the processing means may be comprised in one of the switch boards. This switch board takes over the role of a server whereas the other ones are operated as clients in a server-client architecture. Such a server-client architecture can be managed relatively easily based on server-client management software.

According to an embodiment the processing means is further configured to control supply of electric power to the first one or to the first and second ones of the plurality of USB connections only as long as data connection is established between the USB data storage device connected to the first one of the plurality of USB connections and the electronic device connected to the second one of the plurality of USB connections. In principle, each of the plurality of USB connections can be supplied with electric power. However, as soon as the one-by-one connection between the USB data storage device connected to the first one of the plurality of USB connections and the electronic device connected to the second one of the plurality of USB connections is established power is automatically only supplied to the USB data storage device connected to the first one of the plurality of USB connections and not to any other of the USB connections (not presently needed during data connection of the electronic device and the USB data storage device connected in form of the one-by-one data connection). Consequently, electric power is saved.

The multimedia server means may further comprise an interface configured to receive an input by a user. The interface may comprise an Ethernet, USB, WLAN, WiFi or Bluetooth connection, for example. Particularly, the processing means can be configured to determine from the input by the user which media data is requested by the user and to select the USB data storage device comprising the media data from a plurality of USB storage devices that are connected to respective USB connections in order to establish the one-by-one data connection between the USB data storage device connected to the first one of the plurality of USB connections and the electronic device connected to the second one of the plurality of USB connections.

Furthermore, it is provided an entertainment system comprising the multimedia server means of one of the embodiments described above and a USB data storage device configured to be connected to the first one of the plurality of USB connections of the multimedia server means. Additionally, the entertainment system comprises a receiver configured to play audio and/or video data stored on the USB data storage device and configured to be connected to the second one of the plurality of USB connections of the multimedia server means. As soon as a one-by-one data connection is established between the receiver (or other electronic device connected to the second one of the USB connections) and the USB data storage device the received accesses the media data stored on the USB data storage device and plays it back, for example, over a display and/or loudspeakers of the entertainment system.

The above-mentioned problem is also addressed by a method of playing back audio and/or video data stored on a USB data storage device, comprising the steps of connecting a plurality of USB data storage devices to a multimedia server means comprising a plurality of USB connections and a processing means (connection is established via the USB connections);

connecting a receiver (or other media device) to the multimedia server means via one of the plurality of USB connections;

selecting media data by a user to be played back by the receiver;

determining by the processing means on which one of the plurality of the USB data storage devices connected to the multimedia server means the media data selected by the user is stored;

establishing a one-by-one data connection between the receiver and the one of the plurality of the USB data storage devices determined to store the media data selected by the user; and playing back by the receiver the selected media data received from the USB data storage devices determined to store the selected media data.

Selecting the media data by the user may comprise inputting a command, in particular, transmitting a command via a remote control, to the multimedia server means. In this case, the one of the plurality of the USB data storage devices connected to the multimedia server means on which the media data selected by the user is stored is determined by the processing means based on the command received by the multimedia server means. In other words, the processing means receives and interprets the command and determines on which one of the USB data storage devices the requested media data are stored. Subsequently, the data connection between that determined USB data storage device and the receiver is established. The receiver accesses the data stored on that USB data storage device via the one-by-one data connection and plays back the media data.

The method may be realized such that only the devices actually in operation are supplied with electric power. It may comprise interrupting electric power supply (or not supplying electric power) to the plurality of USB data storage devices with the exception of the USB storage device determined to be the one on which the media data selected by the user is stored, i.e., the particular USB storage device connected with the receiver by the one-by-one data connection.

Furthermore, it is provided a program product, comprising one or more computer readable media having computer-executable instructions for performing the steps of embodiments of the inventive method of playing back audio and/or video data stored on a USB data storage device as described above.

Additional features and advantages of the present invention will be described with reference to the drawings. In the description, reference is made to the accompanying figures that are meant to illustrate preferred embodiments of the invention. It is understood that such embodiments do not represent the full scope of the invention.

Figure 1:
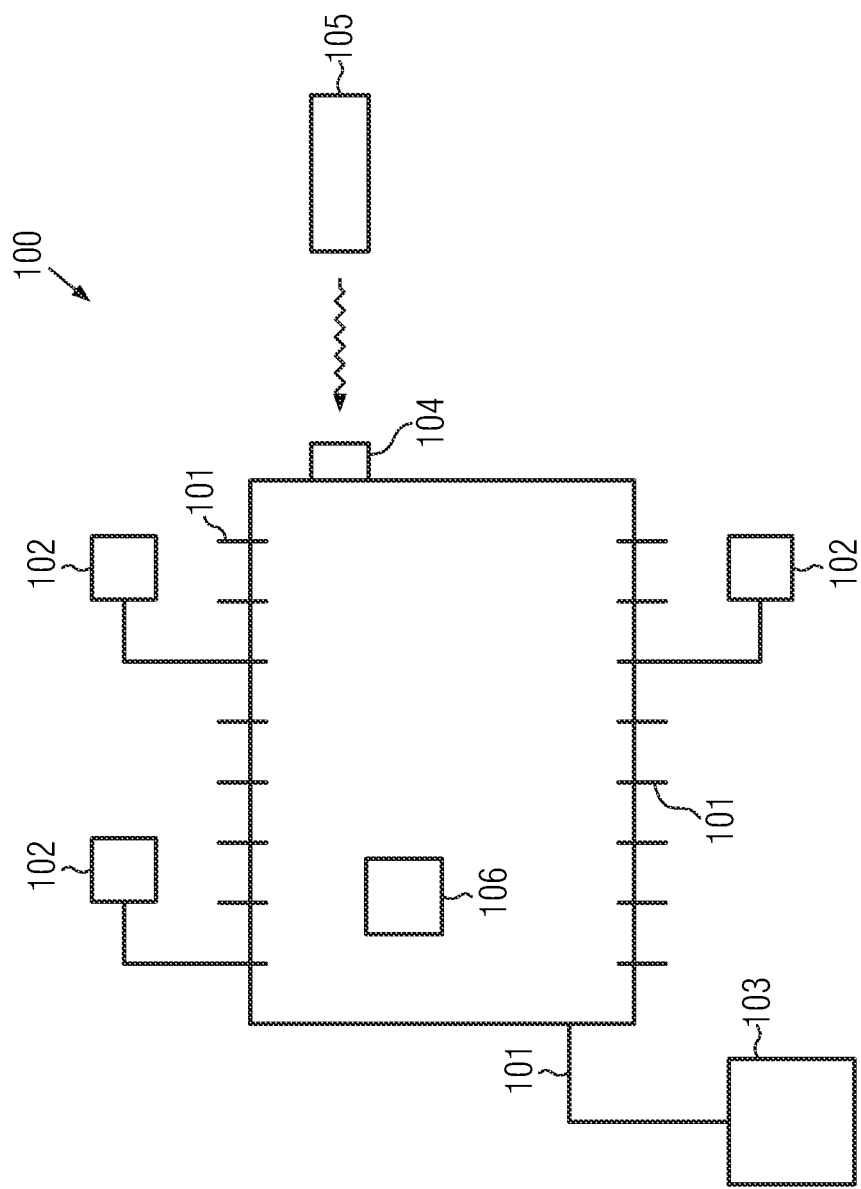
FIG. 1 illustrates a multimedia server means according to an example of the present invention.

FIG. 1 shows a multimedia server means 100 comprising a plurality of USB connections 101. For example, the multimedia server means 101 comprises 16 USB connections for connecting USB data storage devices 102 and an additional USB connection for connecting a receiver 103. In the following, by the term "receiver" any kind of media player is included. Moreover, the multimedia server means 100 comprises an interface 104 that may comprise an Ethernet, USB, WLAN, WiFi, IR or Bluetooth connection. For example, a user may control operation of the multimedia server means 100 by means of an IR remote control 105 via an IR interface 104.

The multimedia server means 100 shown in FIG. 1, moreover, comprises a processing means 106. The processing means 106 may comprise a conventional CPU and it is configured to interpret a command received by the interface 104 and input by a user by means of the remote control 105. In accordance with the interpretation of the received command the processing means establishes a data connection between the receiver and a particular one of the USB data storage devices 102. The data connection (via the USB connections 101) is a one-by-one connection, i.e., the receiver 103 is only connected with the particular USB data storage device. The particular one of the USB data storage devices 102 is determined by the processing means 106 as the USB data storage device that stores the particular media data the user wants to by played back by the receiver 103.

For example, the user sends a command to the multimedia server means 100 indicating that the user wants to watch a movie "XY". The processing means 106 determines on which of the USB data storage devices the media data representing the movie "XY" is stored and establishes a one-by-one data connection between the thus determined USB data storage device and the receiver 103. The user has not to know on which one of the USB data storage devices 102 the data of the movie he wants to watch is actually stored. After it has determined the particular USB data storage device on which the desired media data is stored the processing means 106 can interrupt any power supply to all the other USB data storage devices not needed for playing back the media demanded by the user thereby significantly saving electric power.

Figure 2:
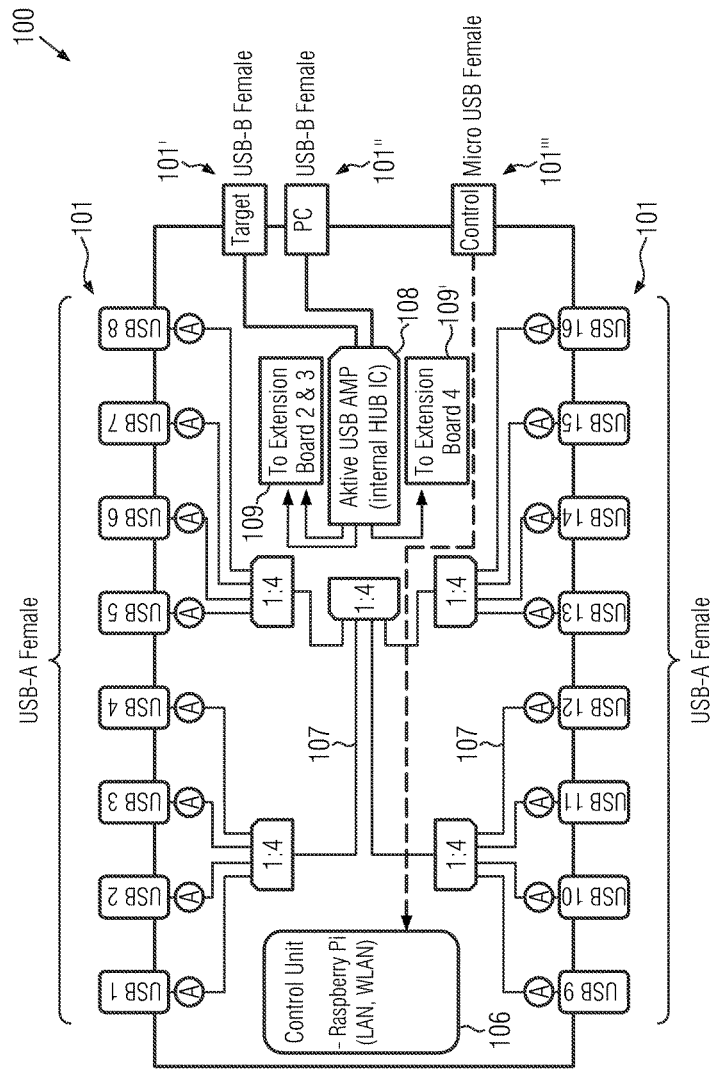
FIG. 2 shows details of a multimedia server means according to an example of the present invention.

In some detail, the multimedia server means 100 shown in FIG. 1 may have the configuration shown in FIG. 2. FIG. 2 shows a top view of a multimedia server means 100 comprising 16 female USB-A connections 101. An additional female USB-B connection 101' is provided for connecting an electronic device, for example, a receiver. Another female USB-B connection 101" is provided for connecting a PC. Additionally, in the example shown in FIG. 2 an interface, for example, comprising a Micro USB Female connection 101''' is provided for allowing connection of an additional control device. Data connection between the USB connections 101, 101', 101" and 102''' is provided by data buses 107.

The multimedia server means 100 comprises a processing means 106 that, particularly, is configured to establish data connections between individual USB connections, i.e., data connections of USB devices connected to the respective USB connections. The processing means 106 may comprise a single-board computer, for example, a Raspberry Pi. The multimedia server means 100 of the example shown in FIG. 1 may operate similar to the multimedia server means 100 shown in FIG. 1.

Moreover, the multimedia server means 100 of FIG. 2 comprises an active USB amplifier 108 and a data connection 109 to two further switch boards (not shown in FIG. 2) and another data connection 109' to another further switch board (not shown in FIG. 2). The further switch boards allow for connection of further USB devices to USB connections comprised in the further switch boards thereby resulting in a cascading multimedia server means comprising one switch board with a processing means 106 and further switch boards without such a processing means. For example, four switch boards each comprising 16 USB connections for connecting USB data storage devices can be provided.

Figure 3:
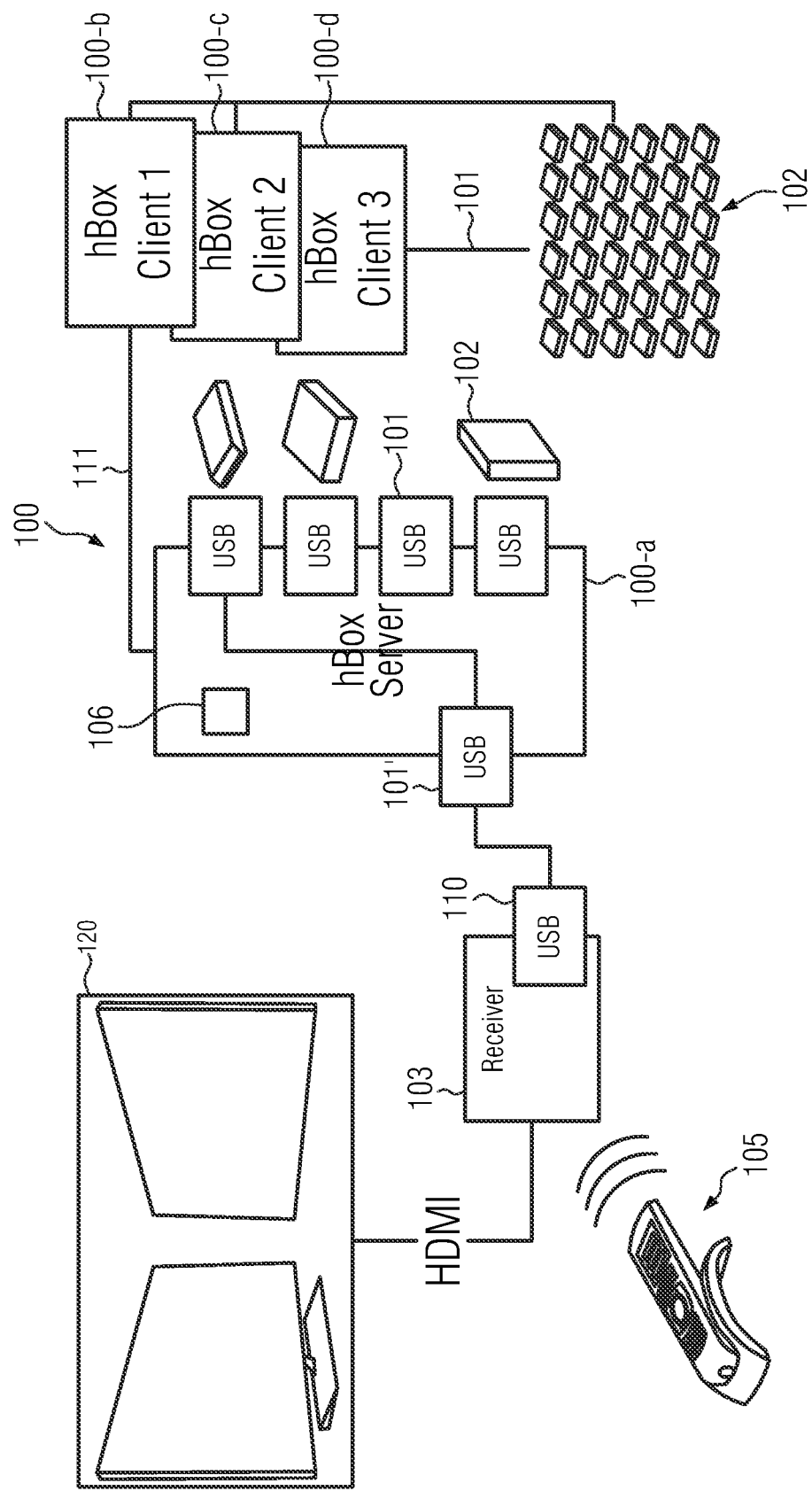
FIG. 3 illustrates a cascading multimedia server means comprising a plurality of multimedia switch boxes according to an example of the present invention.

FIG. 3 illustrates a cascading multimedia server means 100 comprising four switch boards 100-a, 100-b, 100-c and 100-d. One of the switch boards, 100-a, comprises a processing means 106 whereas the other ones 100-b, 100-c and 100-d do not. Data connection 111 between the switch board 100-a comprising the processing means 106 and the other ones 100-b, 100-c and 100-d is established. The cascading multimedia server allows for connecting up to 64 USB data storage devices 102 (16 USB data storage devices for each of the four switch boards, respectively), for example, which allows accessing 256 Tbyte media data by the receiver 103 used for accessing data stored on the USB data storage devices 102. Consequently, a relatively inexpensive technology for accessing a huge amount of media data that is relatively easy to produce and install is provided.

Figure 4:
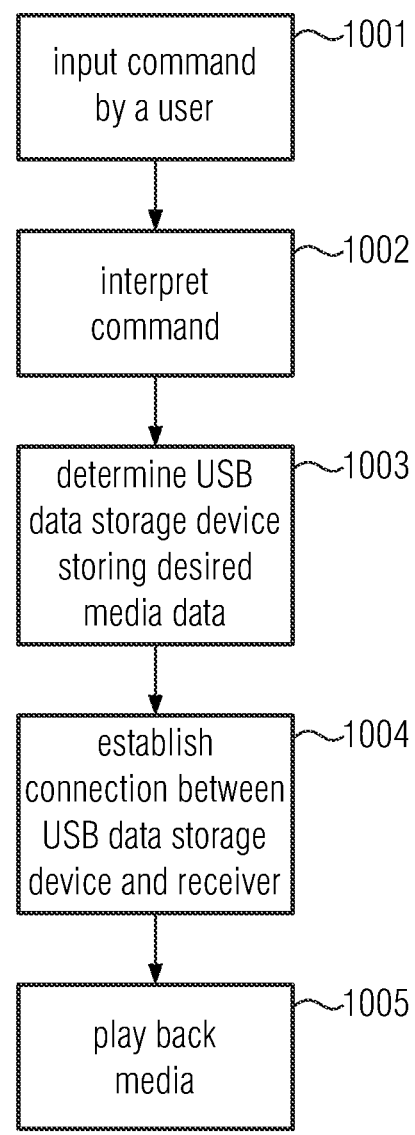
FIG. 4 is a flow chart illustrating a method of playing back audio and/or video data stored on a USB data storage device according to an example of the present invention.

The cascading multimedia server means 100 is part of an entertainment system comprising a receiver 103 for playing back audio and video data content and a display device 120, for example, a television screen. The receiver is connected via USB connection 101' and 110 with the multimedia server means 100. The entertainment system, moreover, comprises a remote control 105 allowing a user control of the operation of the entertainment system. FIG. 4 illustrates operation of the entertainment system comprising the inventive multimedia server means 100.

The method of playing back audio and/or video data stored on one of a plurality of USB data storage devices 102 by a receiver 103 of FIG. 3 starts with inputting 1001 a command by a user to a multimedia server means 100. The command includes information about a particular media the user wants to be played back by the receiver 103. The command can be input by means of the remote control 105, for example, an IR remote control. The command is received by the multimedia server means 100 via an IR interface and interpreted 1002 by a processing means 106.

Based on the interpretation result the processing means 106 determines 1003 which one of the USB data storage devices 102 stores the media data that is desired by the user to be played back. The media data may represent a movie selected by the user from some movie archive that is realized by a plurality of USB data storage devices 102. After the determination step 1003 the processing means 106 establishes 1004 a one-by-one data connection between that determined USB data storage device storing the desired media data and the receiver 106. No other data connection between one of the other USB data storage devices and the receiver 106 is made possible during the one-by-one data connection. In fact, no one of the other USB data storage devices (not storing the desired media data) is supplied with electric power during the time period of establishment of the one-by-one data connection in order to save energy.

It should be noted that the desired media data may be present on any of the USB data storage devices 102 connected to one of the four switch boards 100-a, 100-b, 100-c and 100-d shown in FIG. 3. In particular, the user may simply select a media content to be played-back without any need for knowing about the actual storage place of the corresponding media file.

As long as the particular USB data storage device storing the desired media data (file) is connected via a USB connection to one of the switch boards 100-a, 100-b, 100-c and 100-d the processing means 106 can determine that USB data storage device to be the one comprising the desired media data and establish the data connection between that USB data storage device and the receiver 106. After the data connection between the USB data storage device storing the desired media data and the receiver 106 is established the receiver 106 can receive and play back the media data, for example, by sending the data to the display device 120 shown in FIG. 3.

In conclusion, the present invention provides means for accessing a huge amount of media data stored on a plurality of USB data storage devices (representing a media archive) connected to a multimedia server means that is easy to realize in a cost-efficient manner.

All previously discussed embodiments are not intended as limitations but serve as examples illustrating features and advantages of the invention. It is to be understood that some or all of the above described features can also be combined in different ways.

We claim:

1. A multimedia server, comprising
a plurality of universal serial bus (USB) connections; and
a processor communicatively connected to the plurality of USB connections and configured to:
  establish a one-by-one data connection between a USB data storage device connected to a first one of the plurality of USB connections and an electronic device connected to a second one of the plurality of USB connections; and
  interrupt power supplied to another USB data storage device connected to a third one of the plurality of USB connections when the one-by-one data connection is established.

2. The multimedia server of claim 1, wherein the processor is further configured to control supply of electric power to the first one or to the first one and the second one of the plurality of USB connections when a data connection is established between the USB data storage device connected to the first one of the plurality of USB connections and the electronic device connected to the second one of the plurality of USB connections.

3. The multimedia server of claim 1, further comprising an interface configured to receive an input by a user.

4. The multimedia server of claim 3, wherein the interface comprises an Ethernet, a USB, a wireless local area network, a W-Fi, or a Bluetooth connection.

5. The multimedia server of claim 3, wherein the processor is further configured to determine from the input by the user which media data is requested by the user and to select the USB data storage device storing the media data from a plurality of USB storage devices in order to establish the data connection between the USB data storage device connected to the first one of the plurality of USB connections and the electronic device connected to the second one of the plurality of USB connections.

6. The multimedia server of claim 1, further comprising a plurality of switch boards in data connection with the processor wherein each of the switch boards comprises a USB connection of the plurality of USB connections.

7. The multimedia server of claim 6, further comprising four switch boards each comprising eight USB connections or sixteen USB connections.

8. The multimedia server of claim 6, wherein the processor is included in one of the switch boards.

9. The multimedia server of claim 8, wherein one or more of the switch boards that do not include the processor are clients, and the switch board that does include the processor is a server in a server-client architecture.

10. The multimedia server of claim 1, wherein the electronic device connected to the second one of the plurality of USB connections comprises a receiver for playing audio and/or video data.

11. An entertainment system, comprising:
a multimedia server comprising a plurality of universal serial bus (USB) connections;
a universal serial bus (USB) data storage device configured to be connected to a first one of a plurality of USB connections associated with the multimedia server in a one-by-one data connection; and
a receiver configured to play audio and/or video data stored on the USB data storage device and configured to be connected to a second one of the plurality of USB connections associated with the multimedia server,
wherein the multimedia server comprises a processor communicatively connected to the plurality of USB connections and configured to interrupt power supplied to another USB data storage device connected to a third one of the plurality of USB connections when the USB data storage device is connected to the first one of the plurality of USB connections of the multimedia server.

12. A method for playing back audio and/or video data stored on a universal serial bus (USB) data storage device, the method comprising:
connecting a plurality of USB data storage devices to a multimedia server that includes a plurality of USB connections and a processor communicatively connected to the plurality of USB connections;
connecting a receiver to the multimedia server;
selecting media data to be played back via the receiver to a user;
determining by the processor one or more USB data storage devices included in the plurality of USB data storage devices that are connected to the multimedia server on which the media data is stored;
establishing one-by-one data connections between the receiver and the one or more USB data storage devices;
playing back via the receiver the media data stored on the one or more USB data storage devices; and
interrupting power supplied to each USB data storage device included in the plurality of USB data storage devices other than the one or more USB data storage devices on which the media data is determined to be stored.

13. The method of claim 12, wherein selecting the media data to be played by via the receiver comprises receiving a command via a remote control associated with the multimedia server, and wherein the processor determines the one or more USB data storage devices on which the media data is stored based on the command.

* * * * *